(12) United States Patent
Byers et al.

(10) Patent No.: US 11,079,937 B2
(45) Date of Patent: *Aug. 3, 2021

(54) CLIENT APPLICATION PROGRAM INTERFACE FOR NETWORK-ATTACHED STORAGE SYSTEM

(71) Applicants: Oracle International Corporation, Redwood City, CA (US); Eric M. Hutchins

(72) Inventors: Brandon Patrick Byers, San Diego, CA (US); Scott Philip Chatley, Las Vegas, NV (US); Thanh Trac Phan, San Diego, CA (US); J. Gabriel Gallagher, San Diego, CA (US); Peter Jan Pistek, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 15/201,467

(22) Filed: Jul. 3, 2016

(65) Prior Publication Data

US 2016/0378346 A1 Dec. 29, 2016

Related U.S. Application Data

(63) Continuation of application No. 12/569,579, filed on Sep. 29, 2009, now Pat. No. 9,390,102.

(Continued)

(51) Int. Cl.
*G06F 16/00* (2019.01)
*G06F 3/06* (2006.01)
(Continued)

(52) U.S. Cl.
CPC .......... *G06F 3/0605* (2013.01); *G06F 3/067* (2013.01); *G06F 3/0659* (2013.01);
(Continued)

(58) Field of Classification Search
CPC ...... G06F 17/302; G06F 3/0605; G06F 3/061; G06F 3/0659; G06F 3/067; G06F 16/1827; H04L 67/1097
See application file for complete search history.

(56) References Cited

U.S. PATENT DOCUMENTS 5,708,832 A * 1/1998 Inniss ............... H04L 29/06
709/229
5,781,918 A 7/1998 Lieberman et al.
(Continued)

*Primary Examiner* — Shew Fen Lin
(74) *Attorney, Agent, or Firm* — Invoke

(57) ABSTRACT

Methods and apparatus for providing a network attached storage system which does not require specialized hardware to operate. In one embodiment, a downloadable software package is provided via a web interface. After a user has downloaded and installed the software package, a sharable volume is created upon a host system. In one embodiment, the sharable volume is adapted to present the contents of one or more remote systems to the host system as a local file, drive, or directory. One or more processes resident in the host system are adapted to intercept a command interpretable by the host system and translate the command into one or more commands interpretable by at least one remote system. The one or more commands are then serviced by at least one remote system and a result set is generated. The result set may then be converted into a format interpretable by the host system and output accordingly.

31 Claims, 7 Drawing Sheets

Related U.S. Application Data

(60) Provisional application No. 61/101,106, filed on Sep. 29, 2008.

(51) Int. Cl.
    *G06F 16/182*     (2019.01)
    *H04L 29/08*     (2006.01)

(52) U.S. Cl.
    CPC .......... *G06F 16/1827* (2019.01); *G06F 3/061* (2013.01); *H04L 67/1097* (2013.01)

(56) References Cited

U.S. PATENT DOCUMENTS

| | | | |
|---|---|---|---|
| 5,953,514 A * | 9/1999 | Gochee | G06F 9/547 |
| | | | 703/13 |
| 5,953,685 A | 9/1999 | Bogin et al. | |
| 6,434,568 B1 * | 8/2002 | Bowman-Amuah | |
| | | | G06F 16/289 |
| 6,715,007 B1 | 3/2004 | Williams et al. | |
| 6,754,696 B1 | 6/2004 | Kamath et al. | |
| 6,842,770 B1 | 1/2005 | Serlet et al. | |
| 6,889,256 B1 * | 5/2005 | Palevich | H04L 67/06 |
| | | | 709/229 |
| 6,952,737 B1 | 10/2005 | Coates et al. | |
| 7,080,131 B2 | 7/2006 | Palevich et al. | |
| 7,266,555 B1 | 9/2007 | Coates et al. | |
| 7,281,168 B1 * | 10/2007 | Coates | G06F 11/2056 |
| | | | 714/1 |
| 7,330,880 B1 * | 2/2008 | English | H04L 67/2842 |
| | | | 709/203 |
| 7,428,540 B1 * | 9/2008 | Coates | H04L 67/1097 |
| 7,529,778 B1 * | 5/2009 | Dewey | G06F 11/1451 |
| 9,390,102 B2 | 7/2016 | Byers et al. | |
| 2001/0028524 A1 * | 10/2001 | Hoskins | G06F 3/0659 |
| | | | 360/55 |
| 2003/0005455 A1 * | 1/2003 | Bowers | H04N 21/4622 |
| | | | 725/90 |
| 2004/0015740 A1 * | 1/2004 | Dautelle | G06F 9/451 |
| | | | 714/37 |
| 2004/0076236 A1 * | 4/2004 | Duruoz | H04N 19/423 |
| | | | 375/240.25 |
| 2004/0255048 A1 * | 12/2004 | Lev Ran | G06F 16/9574 |
| | | | 709/249 |
| 2005/0091222 A1 * | 4/2005 | Serlet | G06F 17/30067 |
| 2005/0198459 A1 | 9/2005 | Bogin et al. | |
| 2006/0020627 A1 | 1/2006 | Poslinski | |
| 2006/0259949 A1 * | 11/2006 | Schaefer | H04L 63/08 |
| | | | 726/1 |
| 2007/0011213 A1 | 1/2007 | Burton et al. | |
| 2007/0150496 A1 | 6/2007 | Feinsmith | |
| 2007/0174428 A1 * | 7/2007 | Lev Ran | G06F 9/546 |
| | | | 709/218 |
| 2007/0192551 A1 | 8/2007 | Hara et al. | |
| 2008/0240675 A1 | 10/2008 | Berger et al. | |
| 2008/0247600 A1 * | 10/2008 | Date | G06F 16/583 |
| | | | 382/103 |
| 2008/0250024 A1 * | 10/2008 | Kvm | H04L 67/1095 |
| 2009/0094252 A1 * | 4/2009 | Wong | H04L 67/06 |
| 2010/0274772 A1 | 10/2010 | Samuels | |

\* cited by examiner

CLIENT APPLICATION PROGRAM INTERFACE FOR NETWORK-ATTACHED STORAGE SYSTEM

BENEFIT CLAIM; INCORPORATION BY REFERENCE; RELATED APPLICATIONS

This application claims priority as a Continuation of U.S. application Ser. No. 12/569,579 filed on Sep. 29, 2009 which claims priority to U.S. Provisional Application No. 61/101,106 filed on Sep. 29, 2008, the contents of both of which are hereby incorporated by reference.

FIELD OF THE INVENTION

The present invention relates generally to the field of computer networks. More particularly, in one exemplary aspect, the present invention is directed to network-attached storage systems and remote file systems.

BACKGROUND OF THE INVENTION

Network-attached storage (NAS) refers to the provision of file level computer data storage over a computer network that offers data access to heterogeneous network clients.

A NAS unit is essentially a self-contained computer connected to a network which supplies file-based data storage services to other devices on the network.

Network-attached storage may be used, for example, to provide a programmer with access to a storage delivery network containing various application program interfaces. In this respect, network-attached storage may be used to facilitate remote storage while simultaneously preserving storage resources in one or more local devices.

Unfortunately, network-attached storage requires the acquisition of specific hardware and may additionally require information technology resources to manage it. Such hardware solutions are often costly to implement, and in some cases, may even be cost prohibitive.

SUMMARY OF THE INVENTION

The present invention is directed in one exemplary aspect to providing network attached storage system to a client without requiring the client to acquire application-specific hardware. In one embodiment, the contents of a remote device are presented to a host device as a locally mounted file system. Processes resident on the client device are adapted to convert a command interpretable by the file system of the host device into a set of commands interpretable by the remote storage platform. Output from the remote storage platform may then be converted into a format compatible with the host device and output accordingly.

In one embodiment of the invention, a method of performing file operations on a network-attached storage system is disclosed. The method includes: receiving at an interface module disposed within a local file system a command interpretable by the local file system; converting the command into a translated command at the interface module, wherein the translated command is interpretable by a remote file system; transmitting the translated command from the interface module to the remote file system; receiving at the interface module a set of results from the remote file system; and translating the set of results into a format interpretable by the local file system.

In another embodiment, the method includes: translating a file system operation serviceable by a local device into a set of file system operations serviceable by a remote device at an interface module contained within the local device; transmitting the set of file system operations to the remote device; receiving a result from the remote device at the interface module; and generating at the local device an output based at least in part upon the result.

In a further embodiment of the invention, an apparatus for performing file operations on a network-attached storage system is disclosed. The apparatus includes: a memory device adapted to store data; a first set of instructions contained within the memory device and adapted for execution by a processor, wherein the first set of instructions comprise instructions for receiving a command in a first format and for translating the command into a second format recognizable by a remote system; and a communications module connected to the memory device and adapted to transmit the translated command to a remote system.

In another embodiment of the invention, a computer-readable medium for use in a client device of a remote storage system is disclosed. The computer readable medium includes instructions which, when executed by the client device, perform a process comprising: intercepting an input sequence, wherein the input sequence comprises a file operation that references a target file stored within the remote storage system; creating a set of commands based at least in part upon the file operation, wherein the set of commands are interpretable by at least one device disposed within the remote storage system; transmitting the set of commands to the remote storage system; receiving a result set from the remote storage system; and performing the file operation based at least in part upon the result set.

DETAILED DESCRIPTION OF THE EXEMPLARY EMBODIMENTS

Figure 1A:
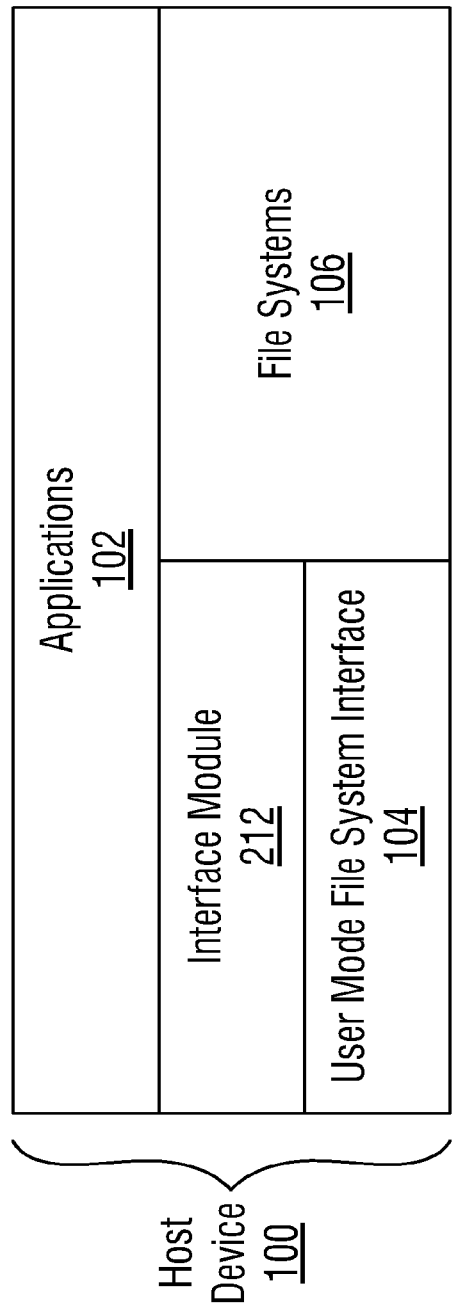
FIG. 1A is a block diagram illustrating an exemplary functional arrangement of a host device adapted to utilize network attached storage according to one embodiment of the present invention.

In the following description of exemplary embodiments, reference is made to the accompanying figures in which it is shown by way of illustration specific embodiments in which the invention can be practiced. It is to be understood that other embodiments can be used and structural changes can be made without departing from the scope of the present invention.

As used herein, the term "application" includes without limitation any unit of executable software which implements a specific functionality or theme. The unit of executable software may run in a predetermined environment; for example, a downloadable Java Xlet™ that runs within the JavaTV™ environment.

As used herein, the terms "computer program" and "software" include without limitation any sequence of human or machine recognizable steps that are adapted to be processed by a computer. Such may be rendered in any programming language or environment including, without limitation, C/C++, Fortran, COBOL, PASCAL, Perl, Prolog, Python, MATLAB, assembly language, scripting languages, markup languages (e.g., HTML, SGML, XML, VoXML), functional languages (e.g., APL, Erlang, Haskell, Lisp, ML, F#and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices also include less dynamic devices such as printers, e-ink devices, and other similar structures.

As used herein, the terms "local" and "remote" refer generally to devices, entities, or users that are serviced by separate sets of processes. These terms are intended to be relative, and bear no absolute reference or connotation to the physical location of the executed processes of the served device, entities, or users.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the term "module" refers to any type of software, firmware, hardware, or combination thereof that is designed to perform a desired function.

As used herein, the term "network" refers generally to any type of telecommunications or data network including, without limitation, cable networks, satellite networks, optical networks, cellular networks, and bus networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, hybrid fiber coaxial, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the terms "processor," "microprocessor," and "digital processor" include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die or distributed across multiple components.

As used herein, the term "server" refers to any computerized component, system or entity, regardless of form, which is adapted to provide data, files, applications, content, or other services to one or more other devices or entities on a computer network.

As used herein, the term "wireless" refers to any wireless signal, data, communication, or other interface including, without limitation, Wi-Fi, Bluetooth, 3G, HSDP/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Although embodiments of the invention may be described and illustrated herein in terms of a network storage system used to facilitate access to a storage delivery network (SDN), it should be understood that embodiments of this invention are not so limited, but are additionally applicable to systems that are used for purposes other than for remote storage. Furthermore, although embodiments of the invention may be described and illustrated herein in terms of devices connected over the Internet, it should it should be understood that embodiments of the invention are also applicable to other types of networks, including, for example, wide, metropolitan, and local area networks.

In one embodiment, the present invention is directed to providing a network attached storage system which does not require application-specific hardware to operate. A downloadable software package is provided via a web interface, but the software package may be provided by various other means in the alternative (including, without limitation, on a compact disc, digital video disc, USB key, or via e-mail). After a user has installed the software package, a sharable volume is created upon a host system. The sharable volume is adapted to present the contents of one or more remote file systems to the host system as a local file, drive, or directory. One or more processes resident in the host system can intercept a command interpretable by the host system and translate the command into one or more commands interpretable by at least one remote system. The one or more commands are then serviced by at least one remote system and a result set is generated. The result set may then be converted into a format interpretable by the host system and output accordingly.

FIG. 1A is a block diagram illustrating an exemplary functional arrangement of a host device 100 adapted to utilize network-attached storage according to one embodiment of the present invention. As shown by the figure, the host device 100 contains one or more conventional file systems 106 (for example, third extended file system, NT File System, etc.) for loading or storing data locally within one or more memory devices. Any number of applications 102 (for example, Common Internet File System, Network File System, Windows Explorer, Nautilus, etc.) may be used to read or write data to the file systems 106.

Additionally, an interface module 212 may be used to interface the applications 102 with files that are stored within one or more remote devices. The interface module 212 may present the data stored within the one or more remote devices to a user or requesting program as a local file, drive, or directory. When file operations are requested, a user mode file system interface 104 can handle the necessary file transfers (i.e., uploads or downloads) with respect to the one or more remote devices.

Figure 1B:
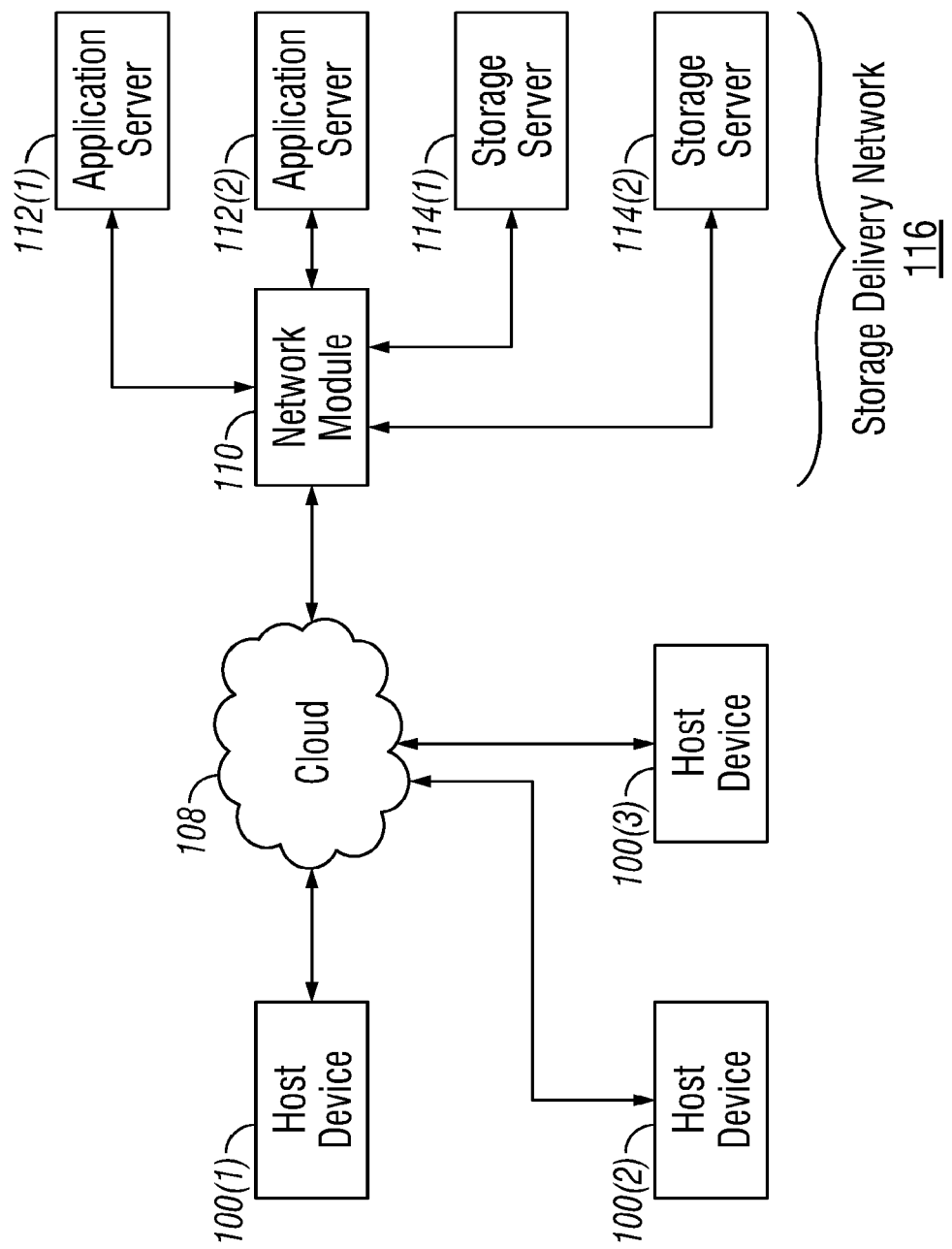
FIG. 1B is a block diagram of an exemplary network topology adapted to provide network attached storage according to one embodiment of the present invention.

FIG. 1B is a block diagram of an exemplary network topology adapted to provide network attached storage to one or more host devices 100 according to one embodiment of the present invention. As shown by the figure, one or more host devices 100 may access the SDN 116 through a series of intermediary network nodes that are represented in FIG. 1B as Cloud 108. In one embodiment, the one or more host devices 100 may interface with a network module 110 that interfaces with a plurality of application servers 112 and/or a plurality of storage servers 114 disposed within the SDN 116. Various types and combinations of network devices may be used for implementing the network module 110, including, without limitation, routers, bridges, hubs, switches, and/or proxy servers.

In one embodiment, the application servers 112(1) and 112(2) are adapted to provide requested content and/or services to a host device 100. The requested content may comprise files, stored data, application program interfaces, executable code, class data, text, images, multimedia applications, streaming audio/video, references to other data (such as pointers, meta-data, web-links, and other such references) and/or other types of content according to embodiments of the present invention. Note that in some embodiments, a single application server 112 is adapted to process each request issued by a host device 100. In other embodiments, multiple application servers 112 may be utilized to process a single request. Various types of concurrent processing may be used to accomplish this purpose, including, for example, distributed computing, grid computing, cluster computing, and/or parallel processing.

In some embodiments, one or more storage servers 114 disposed within the SDN 116 may be used by the one or more host devices 100 for remote storage purposes. An interface module 212 resident within the host device 100 may present remote storage space contained within the one or more storage servers 114 as a local file, drive, or directory. The storage servers may include any combination of volatile and non-volatile memory according to embodiments of the present invention.

Note also that mandatory or discretionary access control policies may be used for implementing security policies according to some embodiments of the present invention. In some embodiments, access rights to one or more files and/or directories disposed within the SDN 116 may be assigned per user, user group, network, or organization. In some embodiments, file owners, groups, and/or permissions for files or directories may be set using standard POSIX file system functions which are transmitted to the SDN 116 and are subsequently stored as metadata.

Optionally, access to a sharable volume presented to one or more users of a host device 100 may be governed by a sign-on authentication process (e.g., Single-Sign On Integration). Login/Password data for each account may be stored within the host device 100, a network device, or some other device via a secure connection according to embodiments of the present invention. In some embodiments, the appropriate security credentials may be passed through to the SDN 116 for remote authentication.

Additional modules may also be included in order to increase network performance. For example, in one embodiment, a host device 100 may comprise a split-streaming module adapted to simultaneously stream a single upload to multiple locations within the SDN 116. Advantageously, the split-streaming module may obviate node-to-node copying between storage servers 114 for the purposes of achieving redundancy and/or for backup archival purposes.

In some embodiments, multi-streaming is supported. That is to say, a request to upload of a single file to the SDN 116 may be serviced by a number of threads executing simultaneously or near-simultaneously within a single application process executing within a host device 100. Additionally, one or more upload requests may be serviced simultaneously.

In some embodiments, a progressive MD5 technique may be used to expedite a transfer process. MD5 is a conventional hashing technique that is used to confirm that a particular file have been successfully transmitted from a source device to a destination device. In conventional MD5, file data is hashed at both the source device and the destination device. If the results of the hashes are identical at both devices, the file is deemed to have been transmitted successfully.

By utilizing a progressive MD5 technique, MD5 calculations may be performed as bytes are received, instead of deferring all MD5 operations until after all bytes of the file have been transmitted. In this manner, most of the MD5 calculations can be performed concurrently with the transmission of the file, thereby yielding a shorter transfer operation.

In some embodiments, ItemIDs may be used to reference a particular file instead of a conventional directory/filename format. ItemIDs may thus serve as unique identifiers for the files of a certain user group, network, or organization. Note that ItemIDs can be assigned to a file before or after the file has been transmitted to the SDN 116.

In some embodiments, multiple instances of an interface module 212 running on a plurality of host devices 100 within the same local area network may communicate with each other in order to service a request initiated at one of the host devices 100. For example, if host device 100(1) and host device 100(2) are within the same local area network, an interface module running on host device 100(1) may first check with host device 100(2) to determine whether host device 100(2) has the requested file within its cache. If so, host device 100(2) may request the file directly from host device 100(2), thereby obviating an expensive transfer from the SDN 116.

In some embodiments where an interface module 212 resident on a host device 100 is adapted to present files, directories, and subdirectories as a single, composite file, the interface module 212 may be adapted to support block data transmissions. Thus, if a user wishes to edit only one file that is referenced in a composite file that also happens to reference dozens of other files, directories, and subdirectories, then only the blocks of data that have actually been modified will be uploaded to the SDN 116 for storage, as opposed to all the data referenced within the composite file. Similarly, if a user requests access to a certain file, a host device 100 may download only the specific file the user has requested, instead of downloading all of the data referenced by the composite file that also references the requested file.

In some embodiments, the host device 100 comprises a traffic control module (e.g., NBeam) adapted to limit the amount of traffic being transmitted to the SDN 116. In one embodiment, a hash function is used for implementing traffic control, but other techniques may be alternatively employed in accordance with embodiments of the present invention. In one embodiment, the traffic control module is adapted to receive one or more signals from a device or module disposed within the SDN 116. The signals may serve to indicate a state change in the traffic control module (e.g., to enable a certain upload and/or download speeds, to issue alert messages, and/or to toggle activation of network functionality of the host device 100).

In some embodiments, the host device comprises a transfer optimization module adapted to increase throughput of transfer to the SDN 116 via compression and/or other techniques. In some embodiments, the transfer optimization module may be adapted to facilitate control of inbound or outbound packets. Advantageously, a transfer optimization module can enhance upload/download speeds and has the potential to decrease the amount of network resources necessary for performing one or more transactions with the SDN 116. Various upload acceleration algorithms may be used for these purposes. These algorithms may be provided externally (for example, via NBeam or another application, via a remote library, or via one or more plug-ins), or may be contained within the interface module 212 itself.

In some embodiments, an interface module 212 resident on a host device 100 is adapted to perform process optimizations on a batch or sequence of requested commands. That is, logic resident on the host device 100 may analyze a sequence of operations and forward to the SDN 116 the smallest subset of operations that would achieve the same result as executing all of the operations in the sequence. For example, a set of ten commands may be pre-processed in order to determine which commands (if any) are redundant commands, and which commands (if any) are serviceable by a second instance of an interface module 212 executing within the same local area network. Thus, if three commands were determined to be redundant, and if two commands could be handled by another device within the same local area network, only five commands from the original set of ten may be forwarded to the SDN 116 for subsequent processing. In this respect, the total number of SDN 116 operations can be effectively reduced.

In some embodiments, intelligent caching may be used to reduce the number of memory-swapping operations and to thereby improve transfer performance. In one embodiment, for example, tracking logic may be used to track the most commonly accessed data within the SDN 116. Access to data stored within the SDN 116 may be analyzed and weighted on a global basis, per network, per group of users or organization, and/or per time of access. The results of the tracking analysis may then be used to ensure that the most commonly accessed data remains cached within a certain portion of memory. Various other techniques of intelligent caching may also be utilized according to embodiments of the present invention.

In some embodiments, asynchronous processing may be used to reduce the total number of data transfers to the SDN 116 and to enable temporal optimization of the scheduling of data transfers from the host device 100 to the SDN 116. For example, suppose a user edits and saves a file three times during the course of one hour. With asynchronous processing, each set of changes to the file may be immediately saved to a local version of the file resident within the memory 206 of the host device 100. However, the transfer of the file from the host device 100 to the SDN 116 may occur several hours later, when there is less network traffic and when there is a smaller amount of network activity occurring at the SDN 116. Note that for the purposes of the present example, the number of transfer operations decreases from three to one, as only the most recent version of the edited file will be uploaded to the SDN 116.

In some embodiments, concurrent access to data is supportable. For example, if multiple instances of an interface module 212 are executing simultaneously, each instance may be able to access the same file stored within the SDN 116. In other embodiments, file locking may be used to prevent subsequent access to a file after it has been initially requested by a user.

Where concurrent access to data is supportable, cache synchronization may be used to ensure data consistency among all host devices 100 presently accessing data from the SDN 116. Thus, if a user updates a file being simultaneously accessed by other users interfacing with the same or separate instances of interface module 212, that user's updates will appear to all of the users presently accessing the file.

Additional modules may also be included in order to increase system reliability. For example, techniques in high-availability clustering/failover may be used with respect to one or more host devices 100 in order to ensure that the interface module 212 remains functional in the event that one or more of the host devices 100 fail. In some embodiments, a monitoring application, upon detecting that a certain host device 100 has failed, may immediately restart an application on a redundant host system 100.

In some embodiments, a load balancing module can be utilized in order to optimize the distribution of data transfers among a number of available transmission media (for example, cable, DSL, or wireless connections). The load balancing module may be implemented as software resident within a host device 100, thereby obviating the need for expensive load balancing hardware (web-muxes, ace-blades, etc.).

In some embodiments, a network monitoring module can perform an automatic network health check upon launch and/or at periodic intervals. The network monitoring module may provide network utilization statistics, network quality data, and port configuration data according to some embodiments. In one embodiment, guidance on port configuration is also provided.

In some embodiments, the interface module 212 comprises a file-system level trash folder adapted to recover files/data that have been accidentally deleted by users and/or other applications. In one embodiment, the file-system level trash folder is shielded from access by users and/or other programs, and may only be accessible via the SDN 116.

In embodiments where asynchronous processing is supported, a database file (or alternatively, a snapshot of a database file) that contains all of the asynchronous commands that have yet to be transmitted to the SDN 116 may be transmitted from the host device 100 to the SDN 116 in the event that a host device 100 fails. In this manner, an interface module 212 may be restored to a more recent state in the event of a computer failure (i.e., without losing all of the previously stored asynchronous commands).

In some embodiments, an automated write throttling process may be used to slow down writes to the memory 206 of a host device 100 in order to prevent a buffer overflow. Various techniques may be employed for this purpose, including, for example, monitoring the amount of data presently stored within the buffer, the rate that the buffer is being written to, and/or the rate that data is being transmitted out of the buffer.

Similarly, in some embodiments, an automated upload throttling process may be used to reduce the total number of concurrent transfers to the SDN 116 from the memory 206, or to otherwise cap the data rate of bytes being transferred to the SDN 116. In this manner, an interface module 212 can limit its usage of a network connection that may be used for a variety of other purposes.

Additional modules may also be utilized in order to achieve system manageability. For example, in some embodiments, a web-based configuration utility may be used to enable the adjustment of various configuration settings of one or more interface modules 212. The web-based configuration utility may also enable a network administer to monitor and manage each instance of an interface module 212 presently executing.

Optionally, the web-based configuration utility can also enable a network administrator to save a plurality of configuration profiles associated with one or more instances of an interface module 212. In some embodiments, for example, the configuration profiles may be specifically assigned to each instance of an interface module 212 associated with a particular user group, network, or organization.

In some embodiments, the settings for updating one or more interface modules 212 may also be adjusted by a network administrator (for example, selecting between manual and automatic updates of one or more interface modules 212). Optionally, usage patterns of the SDN 116 may be used to intelligently determine the optimal time for performing an automatic update.

In some embodiments, the SDN 116 may associate an account corresponding to a particular user group, network, or organization with a set of host devices 100 employed by the respective group, network, or organization. In this manner, one or more interface modules 212 may be activated at the SDN 116 without requiring an activation key to be entered by a user.

In some embodiments, errors detected by an interface module 212 may be automatically transmitted to a remote site for subsequent analysis (for example, to the SDN 116 or to the website hosting the aforementioned web-based configuration utility). These errors may then be analyzed in order to generate updates/error corrections for one or more interface modules 212.

Optionally, one or more plug-ins may be utilized at a host device 100 in order to modulate data that is to be transmitted to the SDN 116. The plug-ins may act on the data in any number of ways (for example, by compressing the data to improve transfer speed, by applying additional layers of encryption for added security, or by converting a file into a different file format). Myriad other forms of modulation are also possible according to embodiments of the present invention.

It should be understood that while only two application servers 112, two storage servers 114, and one network module 110 are depicted in the SDN 116, the SDN 116 may comprise any number of application servers 112, storage servers 114, and network modules 110 according to embodiments of the present invention. Additionally, all or a portion of the functionality associated with one or more of the application servers 112, storage servers 114, and network modules 110 may be integrated into a single device or set of devices according to embodiments of the present invention.

Figure 2A:
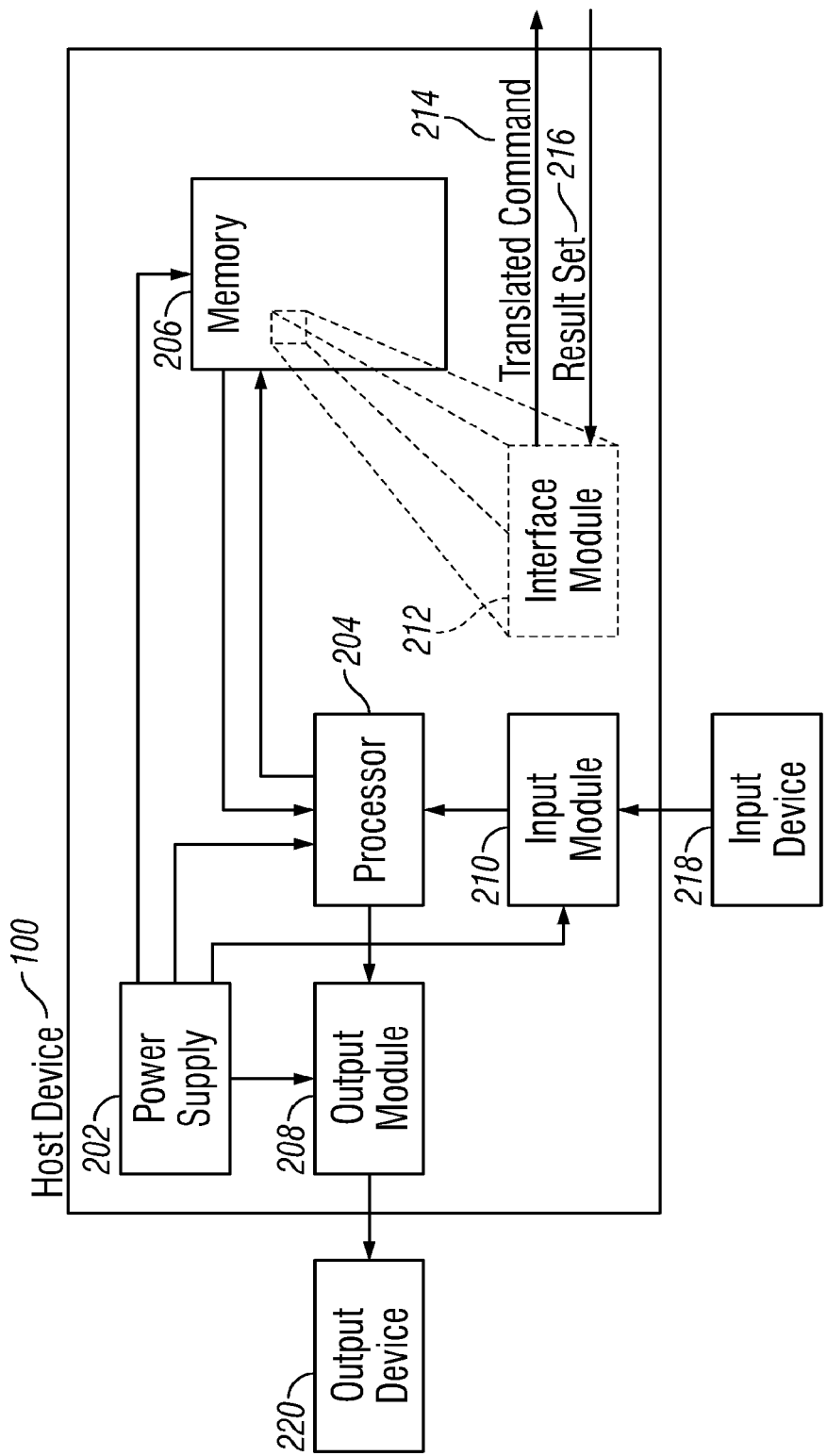
FIG. 2A is a block diagram of an exemplary host device comprising an interface module adapted to translate streams of input according to one embodiment of the present invention.

FIG. 2A is a block diagram of an exemplary host device 100 comprising an interface module 212 adapted to translate streams of input according to one embodiment of the present invention. As shown by the figure, the host device 100 comprises a power supply 202, one or more processors 204, a memory 206 including the interface module 212, an input module 210 adapted to interface with an input device 218, and an output module 208 adapted to interface with an output device 220.

The power supply 202 provides a source of power to modules disposed within the host device 100. In some embodiments, power is supplied externally by one or more conductive wires, for example, from a power cable or a serial bus cable. In other embodiments, a battery may be used as a source of power.

One or more processors 204 are adapted to execute sequences of instructions by loading and storing data to the memory 206. Possible instructions include, without limitation, instructions for data conversions, formatting operations, communication instructions, and/or storage and retrieval operations. Additionally, the processors 204 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. Note also that the processors 204 may be contained on a single unitary IC die or distributed across multiple components.

The input module 210 is adapted to process input generated at an input device 218. The input device 218 may comprise any type or combination of devices capable of providing input to the host device 100, including, without limitation, keyboards, mice, trackballs, touch panels, microphones, controllers (e.g., joysticks), communicative interfaces with networked devices (e.g., network or serial bus interfaces), and/or other types of input peripherals. In some embodiments, the input module 210 is adapted to receive input (e.g., a command, request, or operation) that is serviceable by a local operating system (not shown). In one embodiment, all or a portion of the operating system may be resident within the memory 206.

The memory 206 comprises any type of structure or module adapted to enable digital information to be stored, retained, and retrieved. Additionally, the memory 206 may comprise any combination of volatile and non-volatile storage devices, including, without limitation, RAM, DRAM, SRAM, ROM, and/or flash memory. Note also that the memory 206 may be organized in any number of architectural configurations utilizing, for example, registers, memory caches, data buffers, main memory, mass storage, and/or removable media.

As shown by FIG. 2A, the memory 206 comprises an interface module 212 adapted to intercept a command received at the input module 210 and convert the command into a format interpretable by an operating system resident within a remote device. In one embodiment, the interface module 212 comprises logic for transmitting the resulting translated command 214 to the remote device. In another embodiment, a separate network module is used for this purpose. Note that in some embodiments, multiple instances of the interface module 212 can simultaneously be executed within the same host device 100.

In some embodiments, the interface module 212 is adapted to apply one or more layers of encryption to the translated command 214 before the translated command 214 is sent to the remote device. Various types of encryption may be used for this purpose, including, without limitation, symmetrical and asymmetrical cryptographic systems, block ciphers, stream ciphers, hash systems, public/private key systems and other conventional encryption standards (e.g., Data Encryption Standard (DES), Triple Data Encryption Standard (3DES), Advanced Encryption Standard (AES), etc.). Note that the appropriate decryption protocols may be resident within the remote device itself or a network module connected to the remote device (e.g., a router, bridge, hub, switch, etc.).

In some embodiments, the interface module 212 may be implemented as part of a virtual appliance. One or more virtual appliance emulators may be used for implementing the virtual appliance. These include, without limitation, Parallels, Xen, VMWare, QEMU, and VirtualBox. Other virtual appliance emulators may also be utilized in accordance with embodiments of the present invention.

In some embodiments, the virtual appliance refers to a pre-installed and pre-configured application and operating system environment. In one embodiment, for example, the virtual appliance installs pre-configured into its own space, giving the installer little or no options for configuration at the operating system level. Minimizing the number of configuration options in this respect may simplify the installation process at each host device. Additionally, a smaller number of configuration options often yields a smaller number of generated support requests, thereby reducing the costs of operation.

The interface module 212 may also be adapted to receive a result set 216 generated by the remote device in response to servicing the translated command 214. In one embodiment, the interface module 212 is adapted to convert the result set 216 into a format interpretable by the local operating system (not shown), the output module 208, and/or the output device 220. Note that the result set 216 may comprise the results of an operation or process performed at the remote device, or may simply indicate an acknowledgment that an operation has been successfully or unsuccessfully performed (e.g., an upload operation).

The output module 208 is adapted to present output from the one or more processors 204 to the output device 220. The output device 220 may comprise any type or combination of devices capable of generating output, including, without limitation, display devices (e.g., monitors), printers, projectors, televisions, speakers, networked devices (e.g., computers, digital cameras, personal data assistants, memory devices) and/or other types of output peripherals.

Figure 2B:
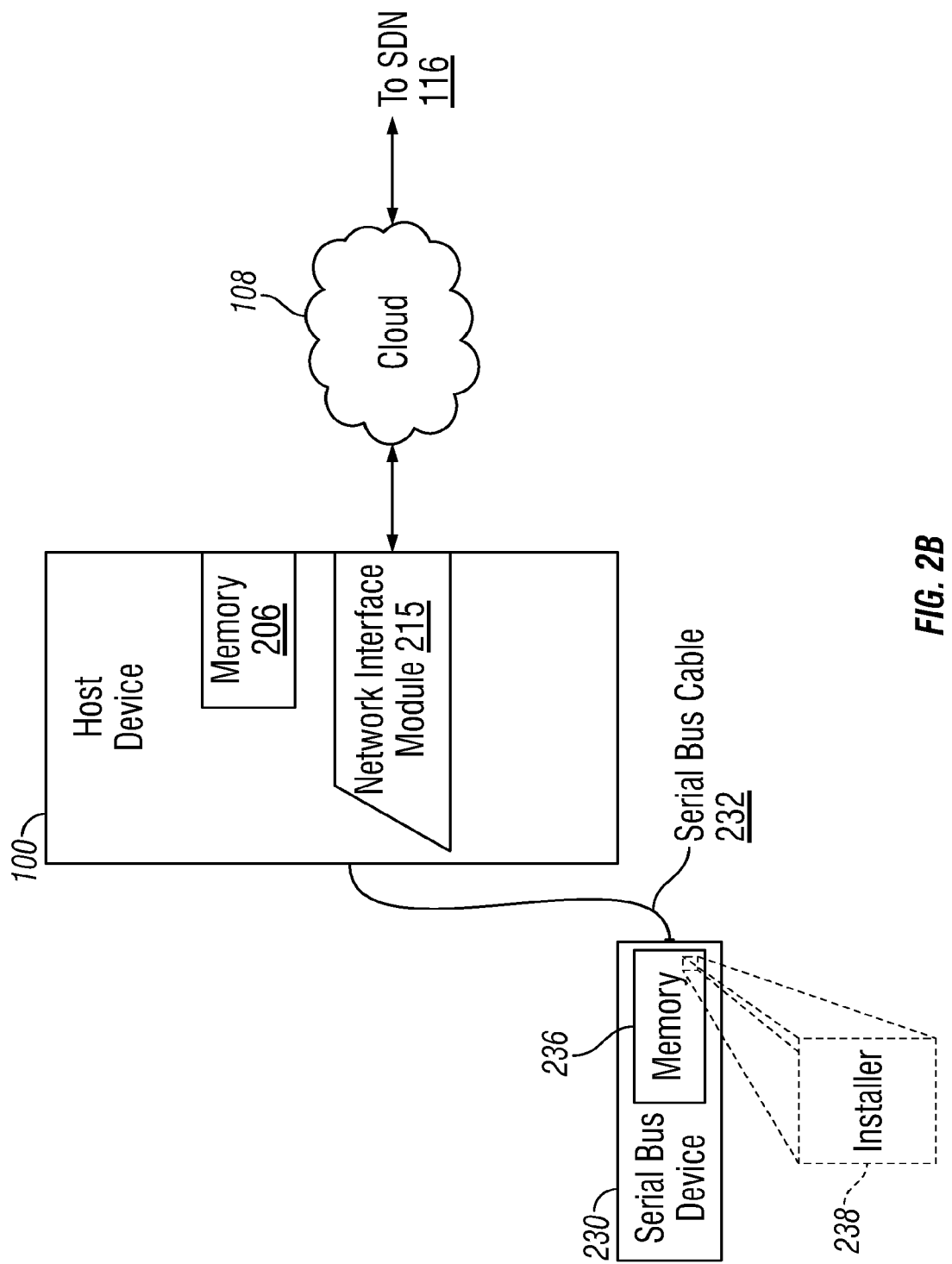
FIG. 2B is a block diagram of an exemplary serial bus device adapted to install an interface module on a host device according to one embodiment of the present invention.

FIG. 2B is a block diagram of an exemplary serial bus device adapted to install an interface module 212 on a host device 100 according to one embodiment of the present invention. As shown by FIG. 2B, a serial bus device 230 (for example, a USB or Fire-Wire device) may connect to a host device 100 via a serial bus cable 232. Once the serial bus device 230 has been recognized by the host device 100, an installer 238 for the interface module 212 that is resident within the memory 236 of the serial bus device 230 can then install a version of the interface module 212 on the memory 206 of the host device 100. A network interface module 215 within the host device 100 can be used to facilitate data transfers between the serial bus device 230 and the SDN 116, buffering data within the memory 236 of the serial bus device 230. The installer 238 may uninstall the interface module 212 from the host device 100 before the serial bus device 230 is disconnected.

Figure 3:
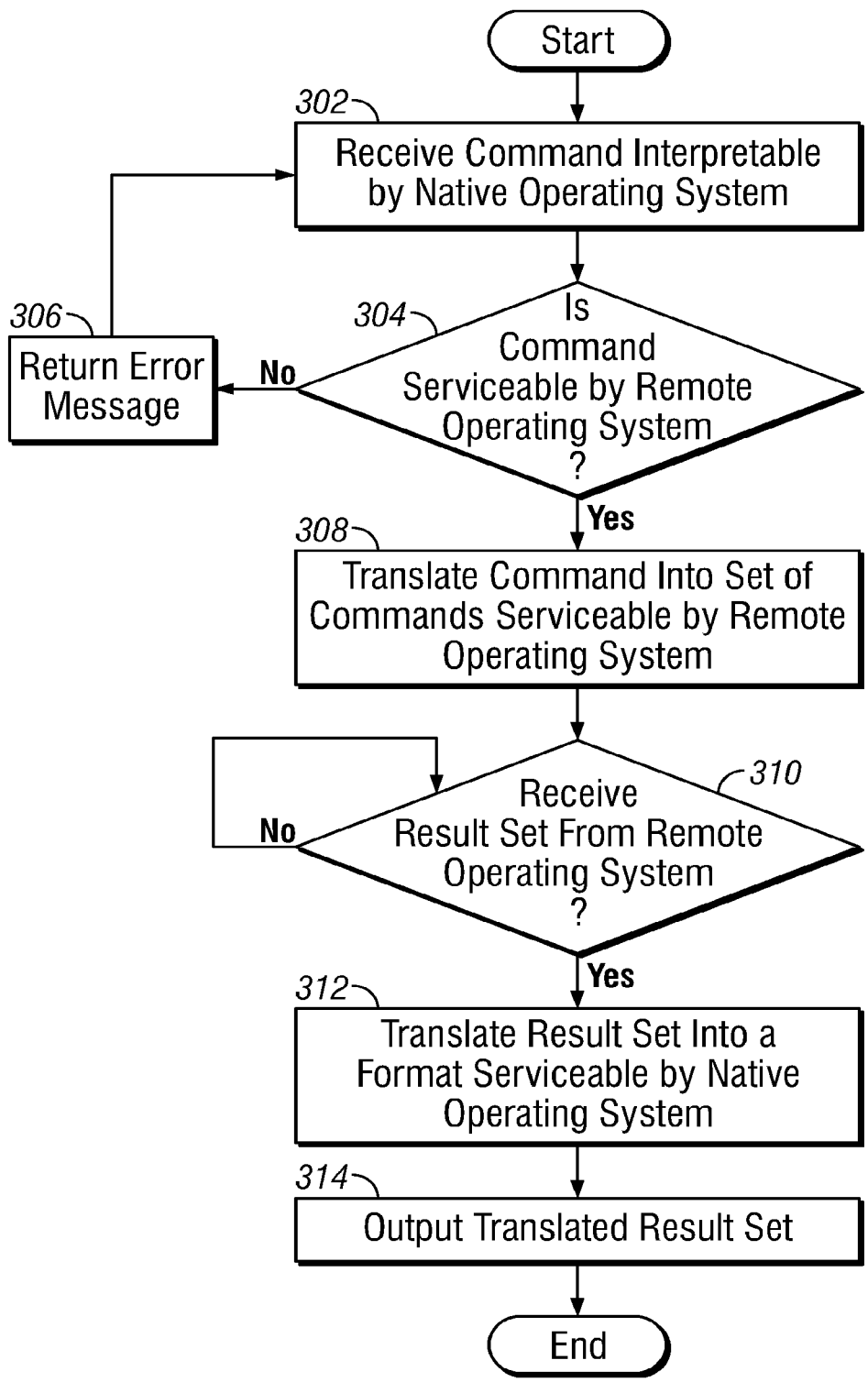
FIG. 3 is a flow diagram of an exemplary method of accomplishing software driven network attached storage according to one embodiment of the present invention.

FIG. 3 is a flow diagram of an exemplary method of accomplishing software driven network attached storage according to one embodiment of the present invention.

At block 302, a command interpretable by a native operating system is received. In one embodiment, the command comprises a shell command serviceable by a local file system. The command may be directly provided by a user via an input device, or provided indirectly via a networked device. Alternatively, the command may be read from one or more files and/or other data sources.

At block 304, the system determines whether the command is serviceable by a remote operating system. In some embodiments, a lookup table, database, or other reference structure is used to determine whether the command is serviceable by the remote operating system. In one embodiment, the lookup table, database, or other reference structure is comprised within a local memory module. In another embodiment, the lookup table, database, or reference structure is stored within a remote memory module.

If the received command cannot be serviced by the remote operating system (for example, if the command is not performable by the remote operating system, if the command has not been provided an appropriate set of translated commands in the lookup table, database, or other reference structure, or if the user, device, or network does not have appropriate permissions to perform the requested operation), an error message is returned at block 306. Various types of error message may be implemented detailing the reasons why the requested operation could not be performed according to embodiments of the present invention. In one embodiment, each the error message is written to a system log upon being output.

Alternatively, if the command is serviceable by the remote operating system, the command is translated into a set of one or more commands at block 308. Note that in some embodiments, a single command, operation, or instruction can translate into multiple commands, operations or instructions according to embodiments of the present invention. In some embodiments, the translated commands are transparent to users of the host device (including, for example, users that are connected to the host device via one or more network protocols). In other embodiments, the translated commands are accessible by one or more users.

At block 310, it is determined whether a result set has been received from the remote operating system. In one embodiment, the system periodically checks whether the result set has been received. In some embodiments, processing additional commands does not occur until the result set corresponding to the latest command has first been processed and/or output. A buffer, queue, or other data structure may be used to store subsequent commands. In other embodiments, each process may comprise its own thread or application space and run concurrently with another process. This may be useful, for example, if certain commands require significant amounts of time or computational resources to perform (e.g., rendering operations), while other commands are capable of being performed instantaneously.

At block 312, the received result set is then translated into a format serviceable by the native operating system. Translation may involve conversion of a plurality of characteristics associated with the result set, including, without limitation, file format, packet structure, bit sequence, compression scheme, network protocol, audio/video codec, header sequence, packet arrangement, resolution, sampling rate, etc. In one embodiment, translated result set is fed to one or more filters before being transferred to an output module. The filters may be used to implement a security policy (e.g. access control), for increasing performance, or for screening out designated content.

The translated result set is then output at block 314. The output may be presented to various types of devices capable of generating output, including, without limitation, display devices, printers, projectors, televisions, speakers, networked devices (e.g., computers, digital cameras, personal data assistants, memory devices) and/or other types of output peripherals. In one embodiment, after the translated result set has been output at block 314, the process repeats for the next command per block 302. In some embodiments, received commands are placed into a buffer, queue, stack, or other data structure until the previous command has been processed and output.

Figure 4:
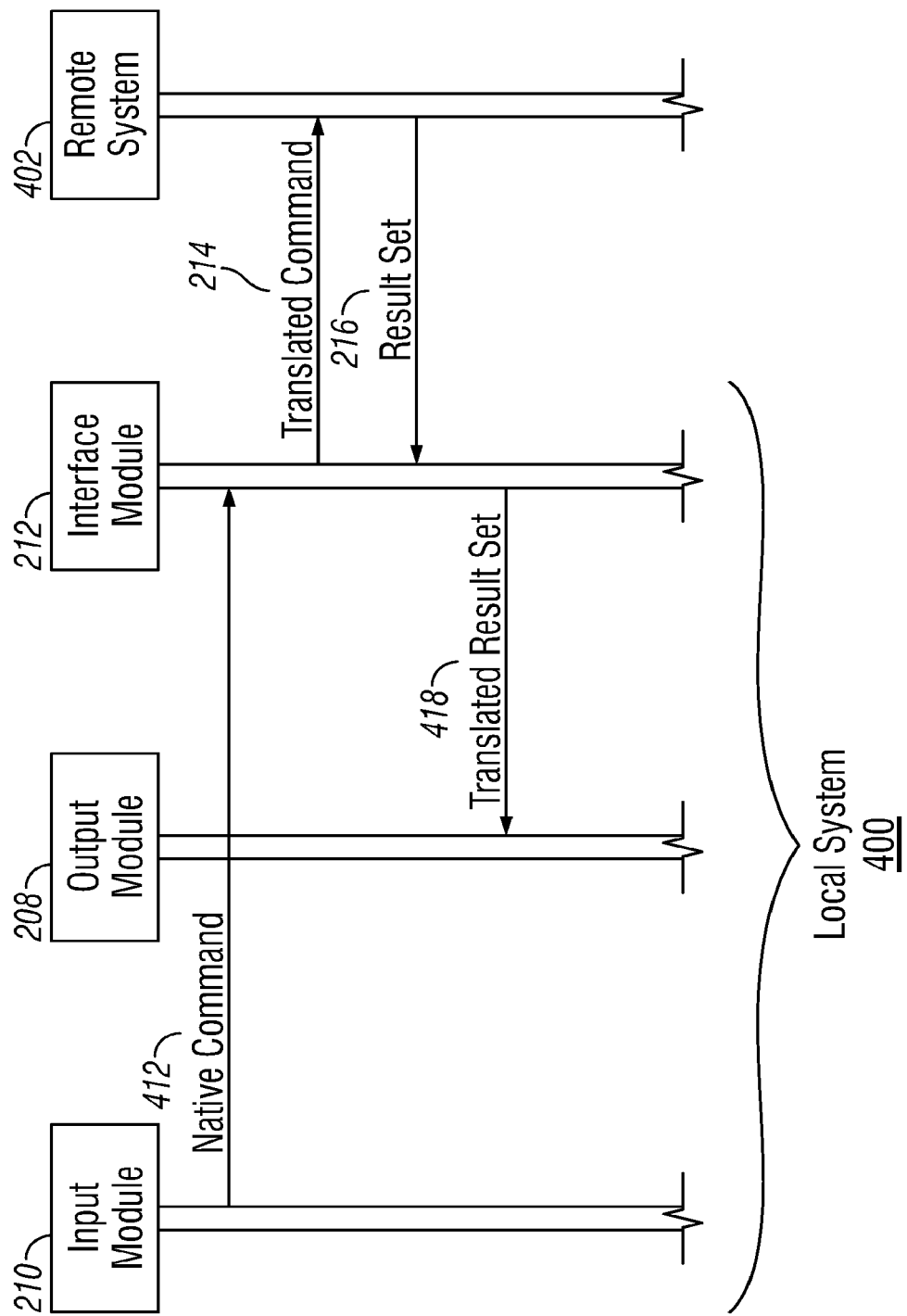
FIG. 4 is a sequence diagram illustrating an exemplary translation sequence according to one embodiment of the present invention.

FIG. 4 is a sequence diagram illustrating an exemplary translation sequence according to one embodiment of the present invention. As shown by the figure, an input module 210, an output module 208, and an interface module 212 are comprised within local system 400. In one embodiment, the local system 400 is adapted to communicate with the remote system 402 via the interface module 212.

Initially, a native command 412 is received at the input module 210 and subsequently intercepted by the interface module 212. In one embodiment, the interface module 212 is a process resident on the local system 400 which may comprise its own operating system functionality (e.g., a process layered upon a general purpose operating system). The native command 412 may be a standard file system operation (e.g., "dir," "cd," "ls," etc.) or may comprise an application-specific operation in the alternative. The native command may be input directly by a user, read from one or more files, or provided over a network from a remote system according to embodiments of the present invention.

In one embodiment, the interface module 212 is adapted to receive the native command 412 and convert the command into a translated command 214. One or more tables, databases, or other reference structures may be used to implement command translation. In one embodiment, the local system 400 comprises a network address lookup table comprising a reference to an appropriate translation table to use with the current network address. This may enable the interface module to operate with a plurality of different remote systems 402, where each remote system 402 comprises a separate operating system and/or a set of recognizable commands.

In some embodiments, the local system 400 may include a download cache adapted to locally cache requested downloads within a reserved mount cache space. The download cache may be implemented to limit the number of concurrent downloads allowable by the local system according to one embodiment of the present invention. The requested downloads may be expired using a queue or other FIFO structure. Optionally, one or more processes may be used to expire requested downloads after a certain period of inactivity has been detected.

Likewise, in some embodiments, the local system 400 may include an upload cache adapted to locally cache requested uploads within a reserved mount cache space. The upload cache may be implemented to limit the number of concurrent uploads allowable by the local system according to one embodiment of the present invention. The requested uploads may be expired using a queue or other FIFO structure. Optionally, one or more processes may be used to expire requested uploads after a certain period of inactivity has been detected.

Note that if a file system is accessible by multiple disconnected clients, this may require the generation of unique inode values. Inode values are unique integers identifying files within a file system.

In some embodiments, globally unique inodes are generated by using .Net GUID objects and converting these objects into strings. The strings may be stored as metadata attached to the file in the SDN 116. In some embodiments, when the file system requests an inode value for a particular file, a CRC64 hash is applied to the GUID) string belonging to the file. The resulting 64-bit integer may then be used as that file's inode value.

In some embodiments, the remote system 402 operates agnostically with respect to the local systems 400 that it interfaces with. In one embodiment, all translation logic is encapsulated within the local systems 400, thereby shielding the remote system 402 from requiring configuration changes adapted to accommodate translation processes. In one embodiment, the interface module comprises logic adapted to determine the operating system associated with the remote system 402. Thus, if the operating system associated with the remote file system 402 is changed or upgraded to a new version, the interface module 212 will be able to automatically adjust to this change without requiring a special alert message to be transmitted from the remote system 402.

After the remote system 402 services the command, it may return a result set to the interface module 212 via one or more return channels according to some embodiments of the present invention. The result set may be the output of a process (e.g., a list of the contents of a directory, the results of a copy operation, the amount of storage space available, etc.) or an acknowledgement that a process has completed successfully (e.g., an attempt to upload a file to the remote system 402).

The interface module 212 may be adapted to convert the result set 216 into a format that is serviceable by the output module 208 according to one embodiment of the present invention. Translation may involve conversion of a plurality of characteristics associated with the result set, including, without limitation, file format, packet structure, bit sequence, compression scheme, network protocol, audio/video codec, header sequence, packet arrangement, resolution, sampling rate, etc. In one embodiment, translated result set is fed to one or more filters before being transferred to an output module. The filters may be used to implement a security policy (e.g. access control), for increasing performance, or for screening out designated content.

Figure 5:
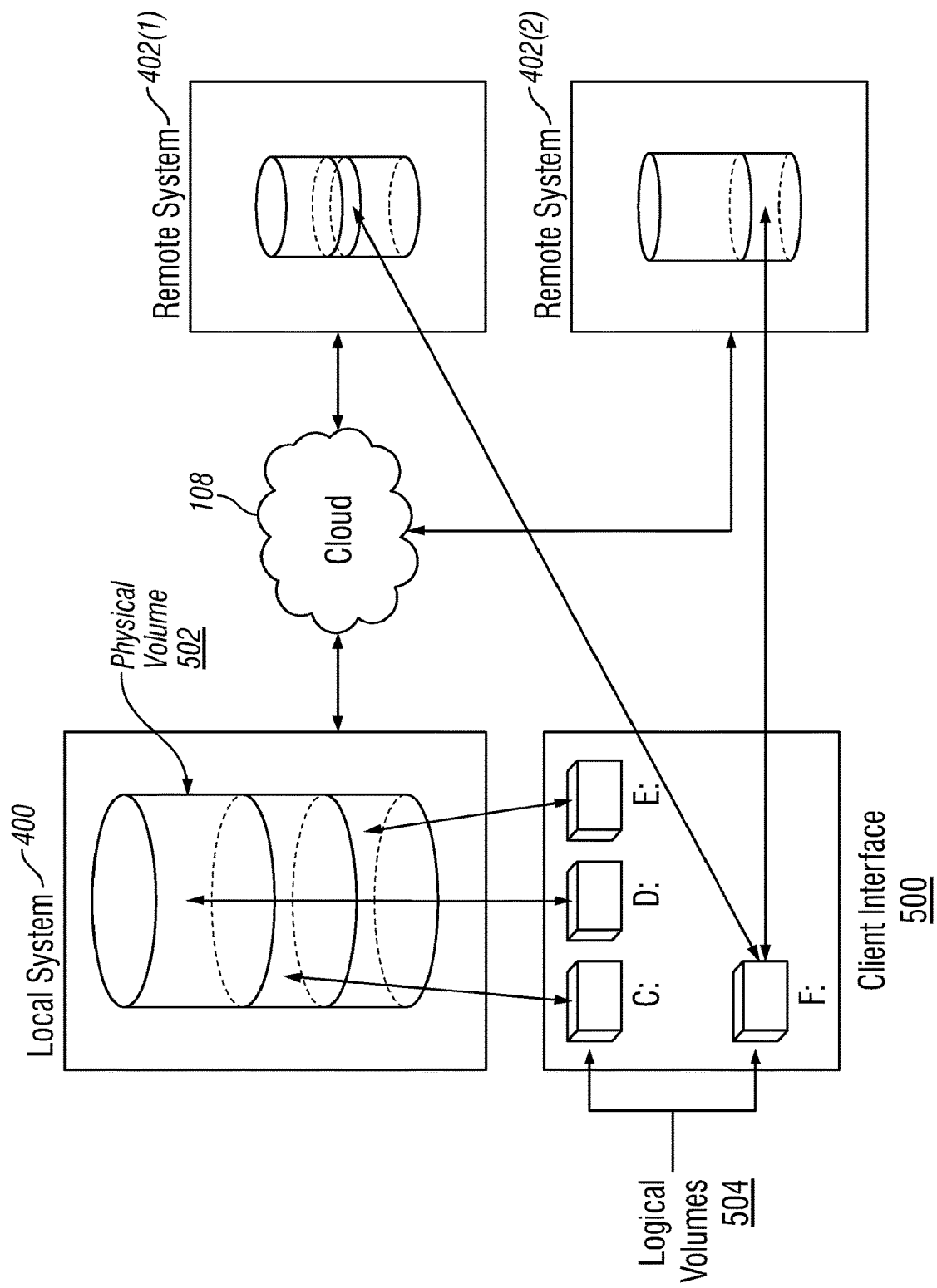
FIG. 5 is a block diagram illustrating an exemplary system of mapping physical volumes into logical volumes according to one embodiment of the present invention.

FIG. 5 is a block diagram illustrating an exemplary system of mapping physical volumes 502 into logical volumes 504 according to one embodiment of the present invention. As shown by the figure, a client interface 500 is adapted to symbolically present a plurality of logical volumes 502 to a user via a graphical user interface or other representative arrangement.

A local system 400 comprises a physical volume 502 that is partitioned into three logical volumes. The logical volumes may be represented as drives or directories depending upon the file system employed. For the purposes of this exemplary illustration, the three logical volumes are shown mapped to a C drive, a D drive, and an E drive. Additionally, an F drive has also been mounted onto the local system 400. As shown by the figure, the F drive points to one or more storage regions disposed within a set of remote file systems 402, but is adapted to appear to the client as a local disk drive.

In some embodiments, discrete regions of storage space disposed within separate remote file systems 402(1) and 402(2) are adapted to appear as a single, contiguous drive, directory, or logical volume 504 via the client interface 502. Alternatively, designated regions of storage space allocated within each remote file system 402 may each map to separate drives or directories within the local system 400.

In some embodiments, the mounted volume is sharable over a local area network, and may be sub-allocated according to user or network device at the local system 400 level.

In other embodiments, the local system 400 comprises a separate logical volume 504 for each user or network device expected to have storage access. Optionally, the logical volumes 504 assigned to other users or network devices may be hidden from the current user or network device connected to the local system 400. One or more administrative accounts may be assigned to have access rights to all logical volumes for the purposes of maintenance or support operations.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. One or more non-transitory machine-readable media storing instructions which, when executed by one or more processors, cause:
   receiving a set of commands at a native operating system that is serviceable and not interpretable by a remote operating system, wherein the set of commands comprises a first command and a second command;
   prior to translating the set of commands into a set of one or more translated commands interpretable by the remote operating system that have yet to be forwarded to the remote operation system:
      (a) determining that the first command is able to be performed by the remote operating system; and
      (b) modifying the set of commands to obtain a modified set of commands by removing the second command from the set of commands responsive to determining that the second command is redundant of the first command, wherein the modified set of commands does not include any redundant commands;
   translating the modified set of commands into the set of one or more translated commands interpretable by the remote operating system;
   transmitting the set of one or more translated commands, that includes a translated version of the first command, to the remote operating system;
   receiving a result set from the remote operating system;
   translating the result set into a translated result set that is serviceable by the native operating system, the translating comprising conversion of a plurality of characteristics associated with the result set, the plurality of characteristics comprising: bit sequence, header sequence, and sample rate; and
   outputting the translated result set;
   receiving a third command that is not serviceable and not interpretable by the remote operating system;
   responsive to determining that the second third command is not able to be performed by the remote operating system:
      refraining from forwarding the third command to the remote operating system; and
      generating an error indicating that the third command could not be performed.

2. The one or more media of claim 1, wherein translating the modified set of commands further comprises:
   identifying a network address of the remote operating system;
   accessing one or more network address lookup tables, databases, or other reference structures comprising at least one reference to at least one corresponding translation table;
   using the network address lookup table to identify a translation table for the network address of the remote operating system; and
   using the identified translation table for translating the modified set of commands into the set of one or more translated commands.

3. The one or more media of claim 2, wherein the one or more network address lookup tables, databases, or other reference structures may be used to translate the modified set of commands into two or more different sets of one or more translated commands according to the remote operating system, where the remote operating system is one of a plurality of different remote operating systems, each of the plurality of different remote operating systems having a separate set of recognizable commands.

4. The one or more media of claim 1, further storing instructions which, when executed by the one or more processors, cause filtering the translated result set, and wherein outputting the translated result set comprises outputting the filtered translated result set.

5. The one or more media of claim 1, further storing instructions which, when executed by the one or more processors, cause caching requested downloads from the remote operating system within a download cache using a first in first out (FIFO) structure.

6. The one or more media of claim 5, further storing instructions which, when executed by the one or more processors, cause expiring of the cached downloads after a predetermined period of inactivity has been detected.

7. The one or more media of claim 5, further storing instructions which, when executed by the one or more processors, cause limiting a number of concurrent downloads to the download cache from the remote operating system.

8. The one or more media of claim 1, further storing instructions which, when executed by the one or more processors, cause caching requested uploads within an upload cache using a first in first out (FIFO) structure.

9. The one or more media of claim 8, further storing instructions which, when executed by the one or more processors, cause expiring the cached uploads after a predetermined period of inactivity has been detected.

10. The one or more media of claim 8, further storing instructions which, when executed by the one or more processors, cause limiting a number of concurrent uploads from the upload cache to the remote operating system.

11. The one or more media of claim 1, further comprising:
receiving, by the first device, a fourth command that is not interpretable by the remote operating system; and
responsive to determining that the fourth command is redundant of the first command, refraining from translating the third command into any translated commands interpretable by the remote operating system.

12. A system comprising:
at least one device including a hardware processor;
the system being configured to perform operations comprising:
receiving a set of commands at a native operating system that is serviceable and not interpretable by a remote operating system, wherein the set of commands comprises a first command and a second command;
prior to translating the set of commands into a set of one or more translated commands interpretable by the remote operating system that have yet to be forwarded to the remote operation system:
(a) determining that the first command is able to be performed by the remote operating system; and
(b) modifying the set of commands to obtain a modified set of commands by removing the second command from the set of commands responsive to determining that the second command is redundant of the first command, wherein the modified set of commands does not include any redundant commands;
translating the modified set of commands into the set of one or more translated commands interpretable by the remote operating system;
transmitting the set of one or more translated commands, that includes a translated version of the first command, to the remote operating system;
receiving a result set from the remote operating system;
translating the result set into a translated result set that is serviceable by the native operating system, the translating comprising conversion of a plurality of characteristics associated with the result set, the plurality of characteristics comprising: bit sequence, header sequence, and sample rate; and
outputting the translated result set;
receiving a third command that is not serviceable and not interpretable by the remote operating system;
responsive to determining that the third command is not able to be performed by the remote operating system:
refraining from forwarding the third command to the remote operating system; and
generating an error indicating that the third command could not be performed.

13. The system of claim 12, wherein translating the modified set of commands further comprises:
translating the modified set of commands into a set of one or more translated commands using one or more tables, databases, or other reference structures.

14. The system of claim 13, wherein the one or more tables, databases, or other reference structures may be used to translate the modified set of commands into two or more different sets of one or more translated commands according to the remote operating system, where the remote operating system is one of a plurality of different remote operating systems, each of the plurality of different remote operating systems having a separate set of recognizable commands.

15. The system of claim 12, wherein the operations further comprise filtering the translated result set, and wherein outputting the translated result set comprises outputting the filtered translated result set.

16. The system of claim 12, wherein the operations further comprise caching requested downloads from the remote operating system within a download cache using a first in first out (FIFO) structure.

17. The system of claim 16, wherein the operations further comprise expiring of the cached downloads after a predetermined period of inactivity has been detected.

18. The system of claim 16, wherein the operations further comprise limiting a number of concurrent downloads to the download cache from the remote operating system.

19. The system of claim 12, wherein the operations further comprise caching requested uploads within an upload cache using a first in first out (FIFO) structure.

20. The system of claim 19, wherein the operations further comprise expiring the cached uploads after a predetermined period of inactivity has been detected.

21. The system of claim 19, wherein the operations further comprise limiting a number of concurrent uploads from the upload cache to the remote operating system.

22. A method comprising:
receiving a set of commands at a native operating system that is serviceable and not interpretable by a remote operating system, wherein the set of commands comprises a first command and a second command;
prior to translating the set of commands into a set of one or more translated commands interpretable by the remote operating system that have yet to be forwarded to the remote operation system:
(a) determining that the first command is able to be performed by the remote operating system; and
(b) modifying the set of commands to obtain a modified set of commands by removing the second command from the set of commands responsive to determining that the second command is redundant of the first command, wherein the modified set of commands does not include any redundant commands;
translating the modified set of commands into the set of one or more translated commands interpretable by the remote operating system;
transmitting the set of one or more translated commands, that includes a translated version of the first command, to the remote operating system;
receiving a result set from the remote operating system;
translating the result set into a translated result set that is serviceable by the native operating system, the translating comprising conversion of a plurality of characteristics associated with the result set, the plurality of characteristics comprising: bit sequence, header sequence, and sample rate; and
outputting the translated result set;
receiving a third command that is not serviceable and not interpretable by the remote operating system;
responsive to determining that the third command is not able to be performed by the remote operating system:
refraining from forwarding the third command to the remote operating system; and
generating an error indicating that the third command could not be performed;

wherein the method is performed by at least one device including a hardware processor.

23. The method of claim 22, wherein translating the modified set of commands further comprises:
  translating the modified set of commands into a set of one or more translated commands using one or more tables, databases, or other reference structures.

24. The method of claim 23, wherein the one or more tables, databases, or other reference structures may be used to translate the modified set of commands into two or more different sets of one or more translated commands according to the remote operating system, where the remote operating system is one of a plurality of different remote operating systems, each of the plurality of different remote operating systems having a separate set of recognizable commands.

25. The method of claim 22, further comprising filtering the translated result set, and wherein outputting the translated result set comprises outputting the filtered translated result set.

26. The method of claim 22, further comprising caching requested downloads from the remote operating system within a download cache using a first in first out (FIFO) structure.

27. The method of claim 26, further comprising expiring the cached downloads after a predetermined period of inactivity has been detected.

28. The method of claim 26, further comprising limiting a number of concurrent downloads to the download cache from the remote operating system.

29. The method of claim 22, further comprising caching requested uploads within an upload cache using a first in first out (FIFO) structure.

30. The method of claim 29, further comprising expiring the cached uploads after a predetermined period of inactivity has been detected.

31. The method of claim 29, further comprising limiting a number of concurrent uploads from the upload cache to the remote operating system.

* * * * *